May 1, 1934.    G. D. BOWER    1,956,753
ELECTRICAL CONTROL SYSTEM
Filed Aug. 9, 1930
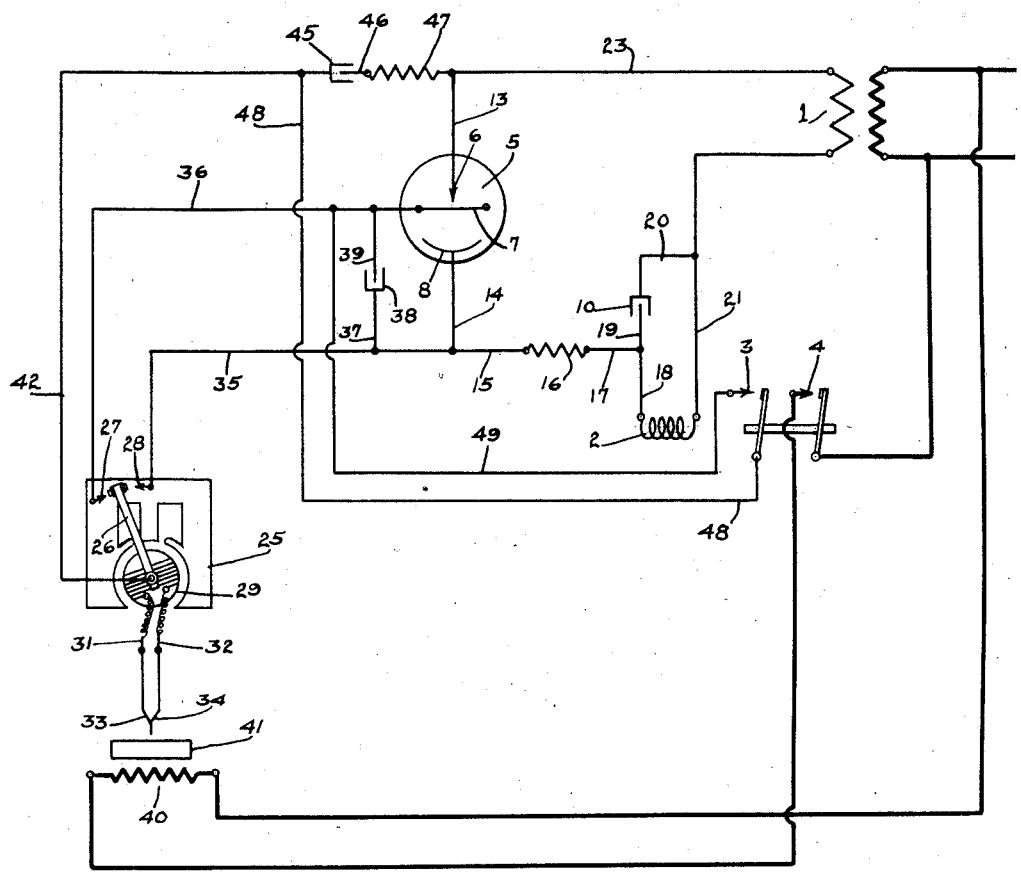
INVENTOR
GEORGE D. BOWER
By Paul, Paul & Moore
ATTORNEYS Patented May 1, 1934

1,956,753

UNITED STATES PATENT OFFICE 1,956,753

ELECTRICAL CONTROL SYSTEM

George D. Bower, Columbia Heights, Minn., assignor to Minneapolis-Honeywell Regulator Company, Minneapolis, Minn., a corporation of Delaware Application August 9, 1930, Serial No. 474,281

5 Claims. (Cl. 236—69)

This invention relates to an electrical control system in which a grid-glow-tube is used as the power multiplying or amplifying device, to control a power circuit of which the tube forms a part, and in which the tube can be controlled by a device which passes a very small amount of current. A valuable application of the invention resides in the control of heating apparatus to the temperatures of which a thermocouple is exposed, and in which the thermocouple is connected to control means which in turn controls the grid glow tube. The device has a wide range of application, but has found particularly valuable use in heat regulation.

This invention relates to the method, as well as the means, for controlling the temperature of a heating device or of work heated thereby. In the present embodiment the control is accomplished by means of a thermo-couple, galvanometer or similar type relay, a grid glow tube, and a relay controlled by the tube, so that it is possible to control a main relay through contacts mounted directly on the arm of the galvanometer. This invention may also be viewed as an ultra sensitive tool adapted to control a heating apparatus by means of a thermocouple.

This invention finds valuable application in control of temperatures by means of a thermocouple connected with a galvanometer which in turn controls a power multiplying device. The thermo-couple does not add any appreciable thermal inertia, and can therefore accurately control the heat applied, for example, to a piece of metal so that heat application is proportionate to the thickness or cross-sectional area of the metal at the particular point at which the operation is occurring. An important feature of the control is its sensitivity.

Features of the invention include the combination of all the devices shown, along with the broad idea of a very sensitive and accurate heat controlling device.

Objects, advantages and features of the invention will appear in the description of the drawing forming a part of this application, and said drawing comprises a single diagrammatic view illustrating but one of many possible embodiments, but a very valuable embodiment of the invention.

The system as illustrated, includes a source of power 1 which may be a transformer, and a relay including coil 2 and contacts 3 and 4 controlled thereby. The contact 3 is a holding contact, the purpose of which is explained below. The contact 4 is adapted to control any suitable load such as an electric heater 40. This load may also be the fuel control means (burner motor or fuel valve) of a heating apparatus, such as a furnace.

In this case it is assumed that the heater 40 is operating upon a piece of work 41, the temperature of which is to be controlled. Numerals 33—34 indicate the metallic elements of a thermo-couple, which is a very sensitive instrument adapted to accurately indicate the exact temperature at any particular point either of the work 41, or of heater 40, or of a furnace (not shown). Unlike most other devices of this nature, the thermo-couple does not add any appreciable amount of thermal inertia to the system being controlled, or to the temperature measurement zone, and hence greater accuracy in temperature measurements and/or control are obtainable, and high temperatures as well as low can be easily and accurately produced and/or controlled. The thermo-couple is connected with a galvanometer movement, or with a milli-volt meter movement generally indicated at 25. The metallic elements 33—34 are respectively connected by suitable conductors 31—32 with opposite terminals of the coil of the rotor 29 of the device 25. Movable with the rotor 29 of the galvanometer is the usual arm 26 which is adapted to alternatively engage contacts 27—28. Contacts 27—28 are adjustable with relationship to each other and with reference to a scale (not shown). The current handled by the contacts 27—28 is only a fraction of one milli-ampere.

One of the principal objects of this invention is to provide a very sensitive control device in which a very small control current can be used to control a main circuit flow through the grid-glow-tube to cause this tube to act as a relay, to pass current of much larger magnitude than that of the control instrument, and energize coil 2 of the relay, or equivalent device. In this sense the grid-glow-tube is used as a relay and as a power multiplying device.

The grid-glow tube is generally indicated at 5. The tube includes an anode 6 connected by conductors 13—23 with one side of the source 1; a grid 7; and a cathode 8. The cathode is connected by conductors 14—15, resistance 16, and conductors 17—18 with one terminal of coil 2 of the relay. The opposite terminal of the relay is connected by conductor 21 with the opposite side of the source 1. The circuit and elements therein just described may be called the controlled-circuit. This circuit also includes smoothing condenser 10 connected on one side by conductor 19 with conductors 17 and 18, and on the other side by conductor 20 with conductor 21. Condenser 10 is for current storage, and is charged during the first quarter of each cycle, and drawn upon during the remainder of the cycle, thus in conjunction with the other features of the relay, preventing chattering of same.

The control circuit, in this instance, includes the pointer of a galvanometer and contacts with which the pointer cooperates as a switching element, and suitable electrical connections between the galvanometer contacts and the grid-glow-tube, for controlling grid charges in a manner to pass, or prevent passage of, current in the power circuit, which includes relay coil 2.

The contact 27 is connected by conductor 36 with the grid 7. Contact 28 is connected by conductor 35 with conductor 14 leading to the cathode, and with conductor 15 leading through resistance 16 to the relay coil 2. Connecting lines 36—35 between the contacts and the grid and cathode is a condenser 38. One end of this condenser is connected by conductor 37 to conductor 35 as shown, the opposite side of the condenser being connected by conductor 39 to conductor 36. The arm 26 is connected by conductor 42 with one side of the current limiting condenser 45. The opposite side of this condenser is connected by conductor 46 with resistance 47, the opposite side of this resistance being connected to conductor 13 and to conductor 23 which last mentioned conductor connects with the opposite side of source 1.

Holding contact 3 is connected on one side by conductor 49 with conductor 36 at a point between the contact 27 and the connection 39. The opposite side of contact 3 is connected by conductor 48 with conductor 42, at a point between the arm 26 and the condenser 45.

Resistance 16 is for the purpose of limiting the amount of current passed by the tube, or power circuit, to prevent injury to the tube. This resistance is part of the total resistance in the power circuit and is only added when there is not sufficient resistance, otherwise. The amount of this resistance depends upon the resistance of the relay coil 2.

As the length of the circuit, including elements 35—36—42 is lengthened, its sensitiveness to external leakage must be reduced. This is accomplished by adding the de-sensitizing condenser 38, which connects the cathode 8 to the grid 7. This condenser tends to make the tube less sensitive and to maintain the grid in charged condition over a longer period of time.

The condensers 38—45 and the resistance 47 are so proportioned that the capacities, due to the varying lengths of line of the run to the controlling means will not adversely affect the operation of the system or injure any part of it.

The purpose of resistance 47 and condenser 45 is to compensate for differences in length of the control circuits 35, 36, 42, so that the total resistance between anode and grid is not greatly proportionately varied. The condenser 45 is a current-limiting device for the tube, and fixes the upper limit of the amount of current which may flow in the grid circuit, which circuit includes the contacts 27 and 3 and is controlled when the contact is closed and when the movable element of the thermo-couple 26 lies between contacts 27 and 28. If 45 and 47 were absent, the full current would pass through contact 27 (probably fusing it) and also the tube would be injured. It may be said that these devices act as resistors, or current-limiting devices.

This device may be said to include three circuits, first the controlled circuit including the transformer 1, cathode 8 and anode 6 of the tube, resistance 16, relay coil 2 and condenser 10. Second, a controlling circuit including the grid 7, anode 6, resistance 46, condenser 45, and contact 27 which, when closed, cause the tube to pass current, and a third circuit independent of both of the others including condenser 38, contact 28, and contact 3 which circuit acts to control the grid and cathode to prevent passage of current through the tube.

*Operation*

With the parts positioned as shown in the diagram, (contact 27 open) there is a negative charge on the grid and leakage is taking place from grid to anode. Leakage is constantly maintained from the cathode. The amount of leakage is small within the circuit which includes the thermo-couple. On closure of contact 27 of the galvanometer, the grid charge is so affected that sufficient current flows between cathode and anode to obtain relay energization. The passage of the current is uni-directional between anode and cathode. By this energization, holding contact 3 is also closed, which contact is connected in multiple with contacts 3 and 27, and arm 26, and maintains the tube in condition to pass current after contact 27 opens. When contact 28 closes, condenser 38 is shorted, and the grid is brought to a definite negative potential of the same value as the cathode. The tube now ceases to pass current, coil 2 is deenergized and the relay opens.

The amount of current passing contacts 27—28 is very small, a fraction of a milliampere, and since the resistance between the tube and these contacts may be several megohms, the device herein is not adversely affected whatever the length of the operating circuit. An important application includes the use of the grid glow tube to control a main relay through contacts mounted directly on the arm of the galvanometer. Heretofore, in order to maintain a small current through contacts 27—28, or their equivalents, it was necessary to use a series of delicate relays in cascade between the galvanometer type relay and the final power control relay, such as the relay which includes the coil 2.

By the use of this device, it is possible to maintain a current through contacts 27—28 sufficiently low to prevent any damage to them, and at the same time deliver sufficient operating current for the relay. This is accomplished by utilizing the tremendous amplifying power of the grid-glow-tube. By the use of this device, the coil 2 can be made to receive a current in the neighborhood of 6 to 8 milliamperes at the operating voltage of the tube. The tube acts as a rectifier, so that coil 2 operates on rectified current.

As an example, the condenser 10 may have a capacity of from one-tenth to four micro-farads, and the resistance 16 may be of any amount up to fifteen thousand ohms. These values depend almost entirely upon the characteristics of the relay used. The resistance 47 may be ten megohms. The capacity of condenser 38 may be five hundred micro-micro-farads, and the capacity of condenser 45 may be the same. These values may be varied within wide limits, depending on the conditions involved, and the results desired.

I claim as my invention:

1. A relay including a coil, a power circuit for the coil including a grid-glow-tube, a galvanometer including a member movable between two contacts, connections from one of the contacts for controlling the grid to vary the electric conditions within the tube to obtain passage of current therethrough, connections from the other contact for controlling the grid to vary conditions in the tube to prevent passage of current therethrough, and a holding contact controlled by the relay, and forming a parallel circuit with that contact which controls the grid to obtain passage of current through the tube.

2. A device of the class described comprising an electrically operable device, a power circuit for the device including a space discharge device including a grid, a pair of contacts, means adapted to alternatively control the contacts, connections from one of the contacts for controlling the grid to vary the electrical conditions within the space discharge device to obtain passage of current therethrough, and connections from the other contact for controlling the grid to vary the conditions in the space discharge device to prevent passage of current therein, and a contact controlled by the electrically operable device, for forming a parallel circuit with that contact which controls the grid to obtain passage of current through the space discharge device.

3. A device of the class described comprising an electrically operable device, a power circuit for the device including a grid-glow-tube, a pair of contacts, means adapted to alternatively control the contacts, connections from one of the contacts for controlling the grid to vary the electrical conditions within the tube to obtain passage of current therethrough, and connections from the other contact for controlling the grid to vary the conditions in the tube to prevent passage of current therein, and a contact controlled by the electrically operable means for forming a parallel circuit with that contact which controls the grid to obtain passage of current through the tube.

4. A device of the class described, comprising an electrically operable device, a power circuit for the device including a space discharge device having a grid, a thermo-couple, a galvanometer controlled by the thermo-couple, a pair of contacts alternately directly controlled by a movable part of the galvanometer, connections from one of the contacts for controlling the grid to vary the electrical conditions within the space discharge device to obtain passage of current therethrough, connections from the other contact for controlling the grid to vary the conditions in the space discharge device to prevent passage of current therethrough, and a contact controlled by the electrically operable device for forming a parallel circuit with that contact which controls the grid to obtain passage of current through the space discharge device.

5. A system of the class described comprising, in combination, an electrically operable device, a space discharge device including an anode, a cathode and a grid, a circuit for the electrically controlled device including the anode and cathode of the space discharge device, a first condenser connected between the grid and cathode of the space discharge device, a second condenser connected to the anode of the space discharge device, movable means for alternately completing first and second control circuits, said first control circuit connecting the second condenser to the grid of the space discharge device, a third control circuit in parallel with said first control circuit, and a switch operated by said electrically operable device for completing the third control circuit, said second control circuit including said switch and operating to short circuit the first condenser.

GEORGE D. BOWER.